May 3, 1927. 1,627,167
P. J. FITZGERALD
GASKET
Filed June 22, 1925
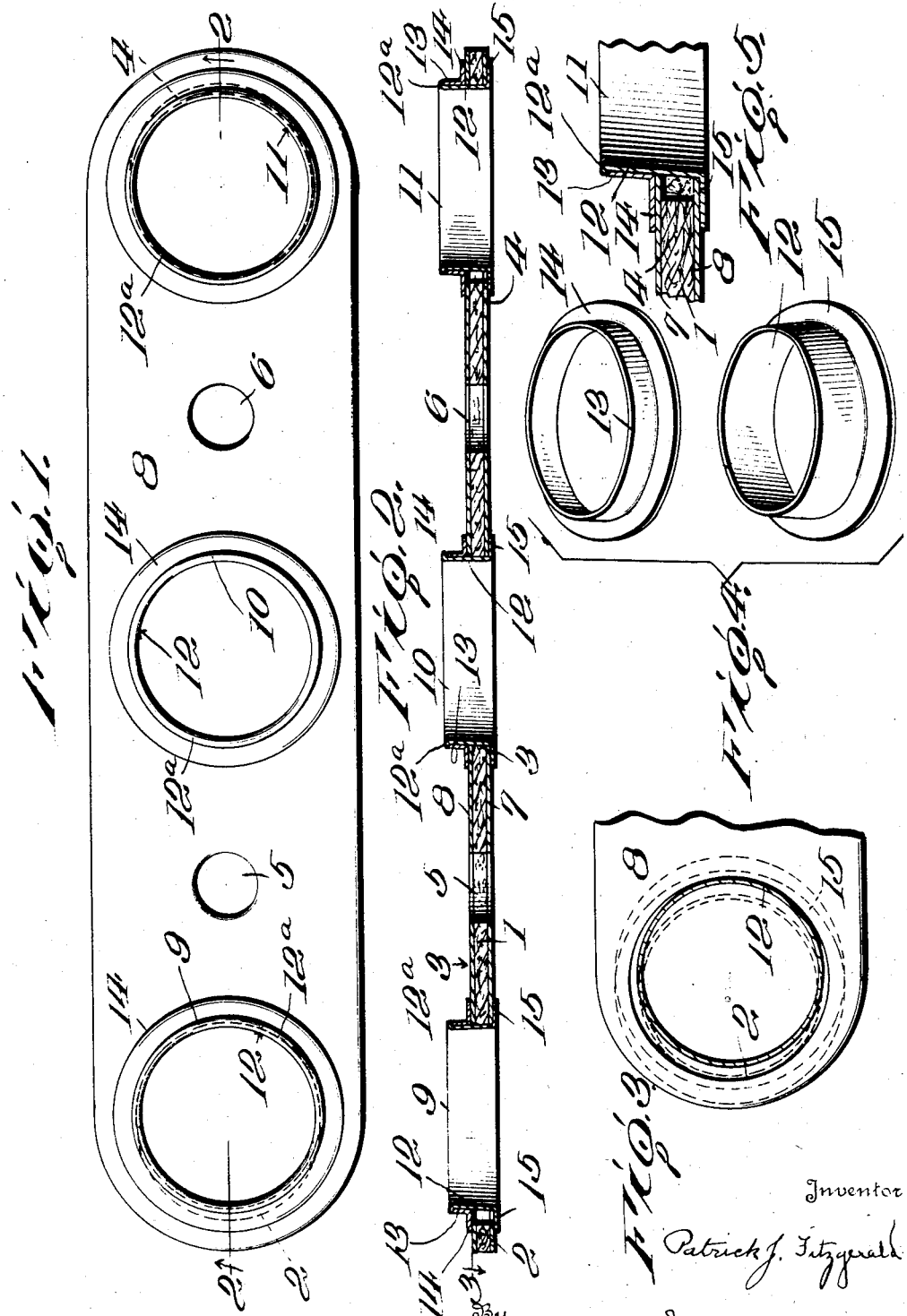

Patented May 3, 1927.

1,627,167

UNITED STATES PATENT OFFICE.

PATRICK J. FITZGERALD, OF TORRINGTON, CONNECTICUT, ASSIGNOR TO THE FITZ-
GERALD MANUFACTURING COMPANY, OF TORRINGTON, CONNECTICUT, A COR-
PORATION OF CONNECTICUT.

GASKET.

Application filed June 22, 1925. Serial No. 38,685.

The invention relates to new and useful improvements in gaskets, and more particularly to a gasket used for attaching a manifold to the cylinder block in a gas engine.

In my Patent No. 1,565,918, granted December 15, 1925, I have shown and described in detail a gasket for manifolds having a plurality of bushings, one for each porthole in the engine block, which bushings are one-piece bushings and so constructed as to secure the metal plates of the gasket against the inner layer of packing material, and also as to center the gasket in the portholes, with which it is to be used. These bushings are all rigidly secured to the body portion of the gasket. Difficulty is found in some instances in getting these bushings placed in the ports, by reason of the fact that the cylinder block becomes warped, or the centers of the ports are not accurately positioned, and this causes great difficulty in getting the projecting portion of each bushing in its respective porthole.

An object of the present invention is to provide a gasket of the general type shown in my prior application, with a bushing construction whereby all but one of the bushings are arranged so that they have a limited lateral sliding movement relative to the body portion of the gasket.

In the drawings which show by way of illustration one embodiment of the invention—

Figure 1 is a plan view of the improved gasket;

Fig. 2 is a sectional view thereof on the line 2—2 of Fig. 1;

Fig. 3 is a view partly in plan, and partly in section on the line 3—3 of Fig. 2;

Fig. 4 is a perspective view showing the two parts of the gasket separated and ready to be assembled, and Fig. 5 is an enlarged sectional view through the central bushing at one side thereof and a portion of the gasket.

In my patent, I have shown a gasket consisting of an asbestos packing which is provided with apertures adapted to register with the portholes in the cylinder block. At each side of said packing is a copper plate, and these copper plates are likewise formed with apertures. The plates are secured to the packing by bushings. There is a bushing for each aperture in the packing. These bushings pass through the packing and through the plates and are provided with flanges which engage the outer faces of the plates and hold the plates securely against the packing. The bushing also has a projecting sleeve portion which is adapted to enter the porthole. These bushings center the gasket relative to the portholes, and also hold the parts of the gasket assembled. The bushings are rigid with the gasket, and sometimes difficulty is found in bringing the sleeves of the bushings into register with the portholes, due possibly to a warping of the cylinder block or inaccurate forming of the portholes.

The present invention has to do with a gasket wherein the bushings which pass through the apertures in the gasket and secure the parts of the gasket together, are much simpler in construction than those of my prior application, and they are also attached to the parts so that all but one of the bushings may be slid laterally relative to the plates and packing for centering the bushing relative to the portholes.

Referring more in detail to the drawings, my improved gasket consists of a center packing preferably of asbestos indicated at 1 in the drawings. This packing is provided with three holes indicated at 2, 3 and 4. There are also bolt-holes 5 and 6 through the packing. On one side of this packing there is a metal plate preferably of copper, indicated at 7, and on the other side there is a similar plate indicated at 8. These plates have apertures therethrough similar to and in alinement with the apertures 2, 3, 4, 5 and 6 above referred to. The plates are secured against the packing by bushings. There is a bushing 9 for the aperture 2, a bushing 10 for the aperture 3, and a bushing 11 for the aperture 4. These bushings are similar in construction, and have been separately numbered merely to indicate their location. The bushing 11 is shown in Fig. 5 as sections therethrough, and with the parts thereof separated in Fig. 4. This bushing consists of an inner sleeve 12 which is formed with a right-angled flange 15. This sleeve 12 is slightly tapered so that it is smaller in diameter at its upper end than at a point adjacent the flange 15. This sleeve is adapted to be inserted in the aperture 4, and when so inserted, the flange 15 bears against the face of the plate 8. Associated with this sleeve 12 of the bushing 11 is another sleeve 13. The sleeve 13 likewise has a right-angled flange 14. This sleeve 13 is tapered similar to the sleeve 12, but is of sufficient diameter to slide over the sleeve 12. After the sleeve 12 has been placed through the opening in the gasket as referred to, the sleeve 13 is then placed on this sleeve 12, and forced downwardly thereon, until the flange 14 engages the upper face of the plate 7. The parts are so proportioned that when the outer sleeve portion 13 of the bushing is pressed down on to the inner sleeve portion 12, it will frictionally engage the same and hold the parts of the bushing assembled. The flange on the inner sleeve engages the outer face of one plate, while the flange on the outer sleeve engages the outer face of the other plate, and these flanges will thus hold the two plates in gripping contact with the packing or asbestos pad 1. As a further aid in holding the parts of the bushing assembled, I spin or turn the outer edge of the sleeve 12 over the outer edge of the sleeve 13 as indicated at 12$^a$ (Fig. 5), and also as indicated in Fig. 2 of the drawings.

The center bushing 10 is so formed as to practically fit the opening, both in the asbestos pad 1 and in the copper plates 7 and 8, so that this bushing is fixed against any lateral movement relative to the body portion of the gasket. The aperture 4 through which the sleeve 12 of the bushing 11 passes, is considerably larger than the diameter of the sleeve 12. The same is true in connection with the bushing 9. This is separately illustrated in Fig. 3 of the drawings, where the sleeve 12 is in section and the aperture 2 through the packing and the plates 7 and 8 are clearly shown as larger than the diameter of the sleeve. The purpose of making these apertures 2 and 4 larger than the diameter of the inner sleeve is to permit a lateral sliding of the bushing on the body portion of the gasket. When the gasket is applied to the engine block, the central bushing is placed in the central port. If, for any reason, the bushing 9 will not register with its port in the engine block, it can be slid laterally on the body portion of the gasket, until the outwardly projecting sleeve portion can be placed in the porthole. The same is true of the bushing 11 at the other end of the gasket. It will be understood, of course, if the gasket is intended for a cylinder having a greater number of portholes, then all but one at least of the bushings, will be capable of being slid laterally on the body portion of the packing.

It will be obvious, of course, that all of the bushings may be so attached to the body portion of the gasket as to be capable of being slid laterally for centering the bushing relative to the ports. However, one of them may be rigid and the others shifted, and accomplish the purpose just as efficiently. It will also be obvious that only two bushings might be used, in which case, one or both could be so connected to the body portion of the gasket as to be slid laterally. These bushings perform the double function of securing the plates to the packing in the forming of the gasket and the centering of the gasket relative to the engine block. The structure of the bushing is very simple, and therefore, these bushings can be cheaply made and quickly applied, as very little bending or folding of the metal is necessary. It will be obvious, therefore, from the broad aspect of the invention, that the bushings may be rigidly attached to the body portion of the gasket and a very simple, cheap structure thus produced.

It will be obvious from the above description that my improved gasket may be applied to the engine cylinder with the bushing projecting outwardly away from the engine block. The bolts for securing the manifold to the gasket passing through the bolt holes in the gasket body position the gasket on the engine block with the openings through the gasket in register with the ports in the engine block, and the bushings extending outwardly from the block into the manifold pipes guide said pipes into proper registration with the cylinder ports.

Having thus described the invention, what I claim as new and desire to secure by Letters-Patent, is—

1. A gasket comprising a body portion having an aperture therethrough, a bushing comprising an inner sleeve adapted to be inserted in said aperture, said sleeve having a flange lying against one face of the body portion, said sleeve projecting beyond the other face of said body portion, an outer sleeve fitting on said inner sleeve and having a flange adapted to engage the opposite face of the body portion, said inner sleeve having its outer edge turned outwardly over the outer edge of the outer sleeve for holding said sleeves assembled.

2. A gasket comprising a body portion having an aperture therethrough, a bushing comprising an inner sleeve adapted to be inserted in said aperture, said sleeve having a flange lying against one face of the body portion, said sleeve projecting beyond the other face of said body portion, an outer sleeve fitting on said inner sleeve and having a flange adaped to engage the opposite face of the body portion, said inner and outer sleeves being tapered so that when the flanges of said sleeves are brought into engagement with the body portion, the tapered portions will be snugly nested together and hold the parts assembled.

3. A gasket comprising a body portion having an aperture therethrough, a bushing comprising an inner sleeve adapted to be inserted in said aperture, said sleeve having a flange lying against one face of the body portion, said sleeve projecting beyond the other face of said body portion, an outer sleeve fitting on said inner sleeve and having a flange adapted to engage the opposite face of the body portion, said inner and outer sleeves being tapered so that when the flanges of said sleeves are brought into engagement with the body portion, the tapered portions will be snugly nested together and hold the parts assembled, said inner sleeve having the outer edge thereof turned outwardly over the outer edge of the outer sleeve.

4. A gasket comprising a body portion having a plurality of apertures, a metal plate at each side of said body portion provided with similar apertures, a bushing for each aperture, each bushing comprising an inner and outer sleeve, each sleeve having a flange, the inner sleeve being adapted to extend through the aperture with which it is located so that its flange engages one side of the body portion of the gasket while the sleeve projects beyond the other face of the body portion, the outer sleeve being adapted to snugly fit upon the projecting end of the inner sleeve with its flange in engagement with the opposite face of the body portion, said sleeves being tapered so as to snugly fit one within the other when the parts are in place on the body portion of the gasket, and the outer edge of the inner sleeve being turned outwardly so as to overlie the outer edge of the outer sleeve and thus aid in holding the parts assembled.

5. A gasket comprising a body portion having an aperture therethrough, a bushing located in said aperture and having spaced flanges engaging opposite sides of the body portion of the gasket and a portion projecting from one face of the gasket for centering the gasket relative to the port to which it is to be applied, said aperture through the gasket being larger than the body portion of the bushing between the flanges whereby said bushing can be slid laterally relative to the gasket.

6. A gasket comprising a body portion having an aperture therethrough, a bushing comprising an inner sleeve, said sleeve adapted to be inserted through the aperture with the flange against one face of the gasket and with a sleeve projecting beyond the other face of the gasket, an outer sleeve adapted to engage the projecting portion of the inner sleeve and having a flange adapted to engage the opposite face of the gasket of that engaged by the flange of the inner sleeve, and means for holding said sleeves assembled with the flanges against the body portion of the gasket, the apertures through said body portion being larger than the inner sleeve whereby said bushing can be moved laterally in the body portion of the gasket.

7. A gasket comprising a body portion having a plurality of apertures, a bushing for each aperture, each bushing comprising a portion extending through said aperture and projecting from one face of the gasket, each bushing having spaced flanges overlying the opposite faces of the body portion of the gasket, the aperture through which one of the bushings is inserted being larger than the body portion of the gasket between the flanges whereby said bushing may slide laterally and thus the bushing shifted relative to the body portion of the gasket for centering the bushings relative to the portholes to which the gasket is applied.

In testimony whereof, I affix my signature.

PATRICK J. FITZGERALD.